T. G. GALE.
RESILIENT WHEEL.
APPLICATION FILED APR. 9, 1917.

1,260,362.

Patented Mar. 26, 1918.
5 SHEETS—SHEET 1.

WITNESSES

INVENTOR
Thomas G. Gale,
BY
ATTORNEY

T. G. GALE.
RESILIENT WHEEL.
APPLICATION FILED APR. 9, 1917.

1,260,362.

Patented Mar. 26, 1918.
5 SHEETS—SHEET 2.

WITNESSES

INVENTOR
Thomas G. Gale,
BY
ATTORNEY

T. G. GALE.
RESILIENT WHEEL.
APPLICATION FILED APR. 9, 1917.
1,260,362.
Patented Mar. 26, 1918.
5 SHEETS—SHEET 3.
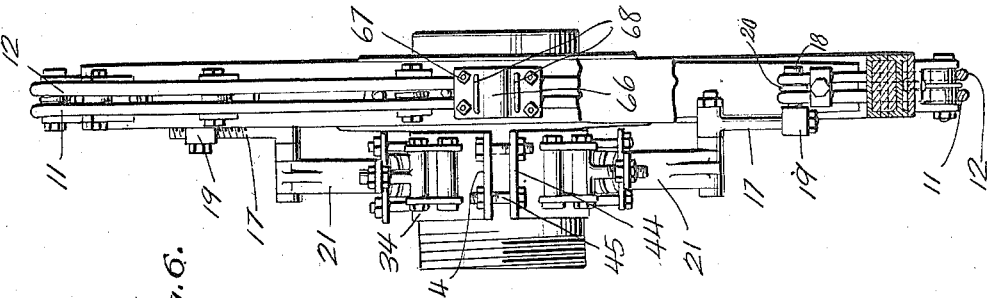
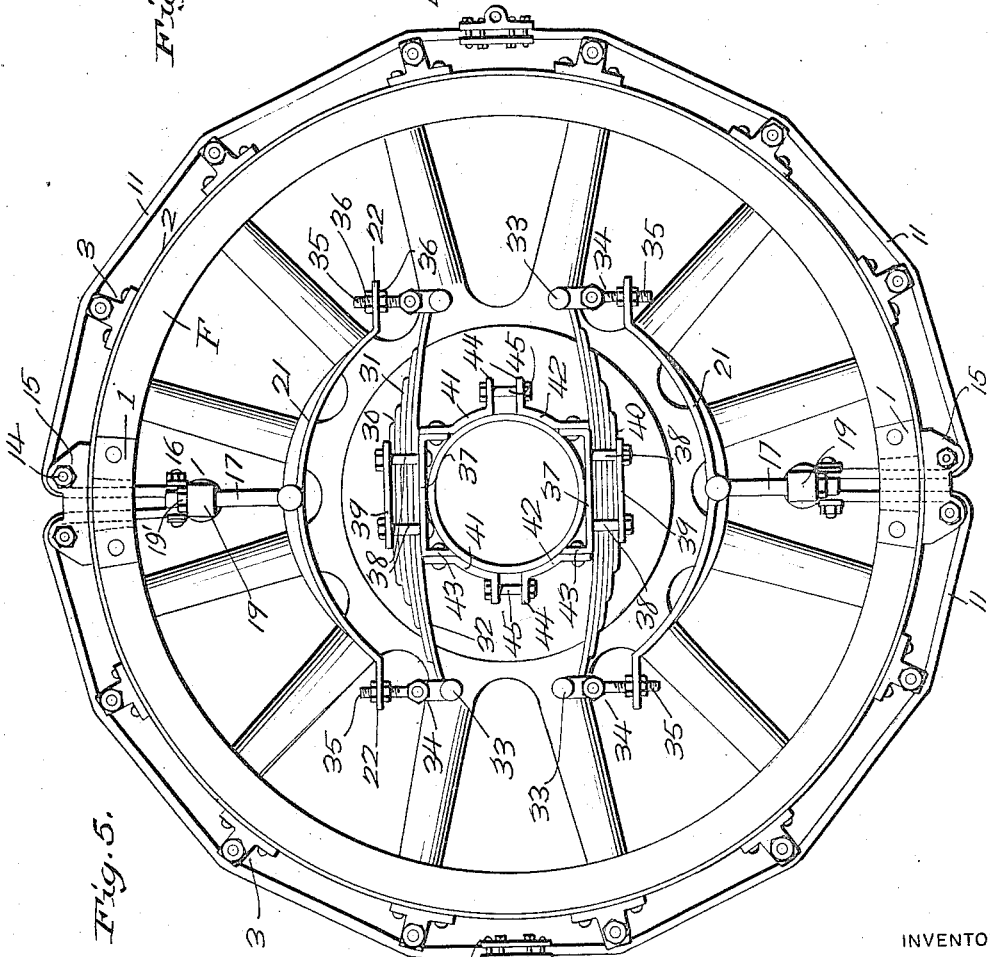
WITNESSES
INVENTOR
Thomas G. Gale,
BY
ATTORNEY

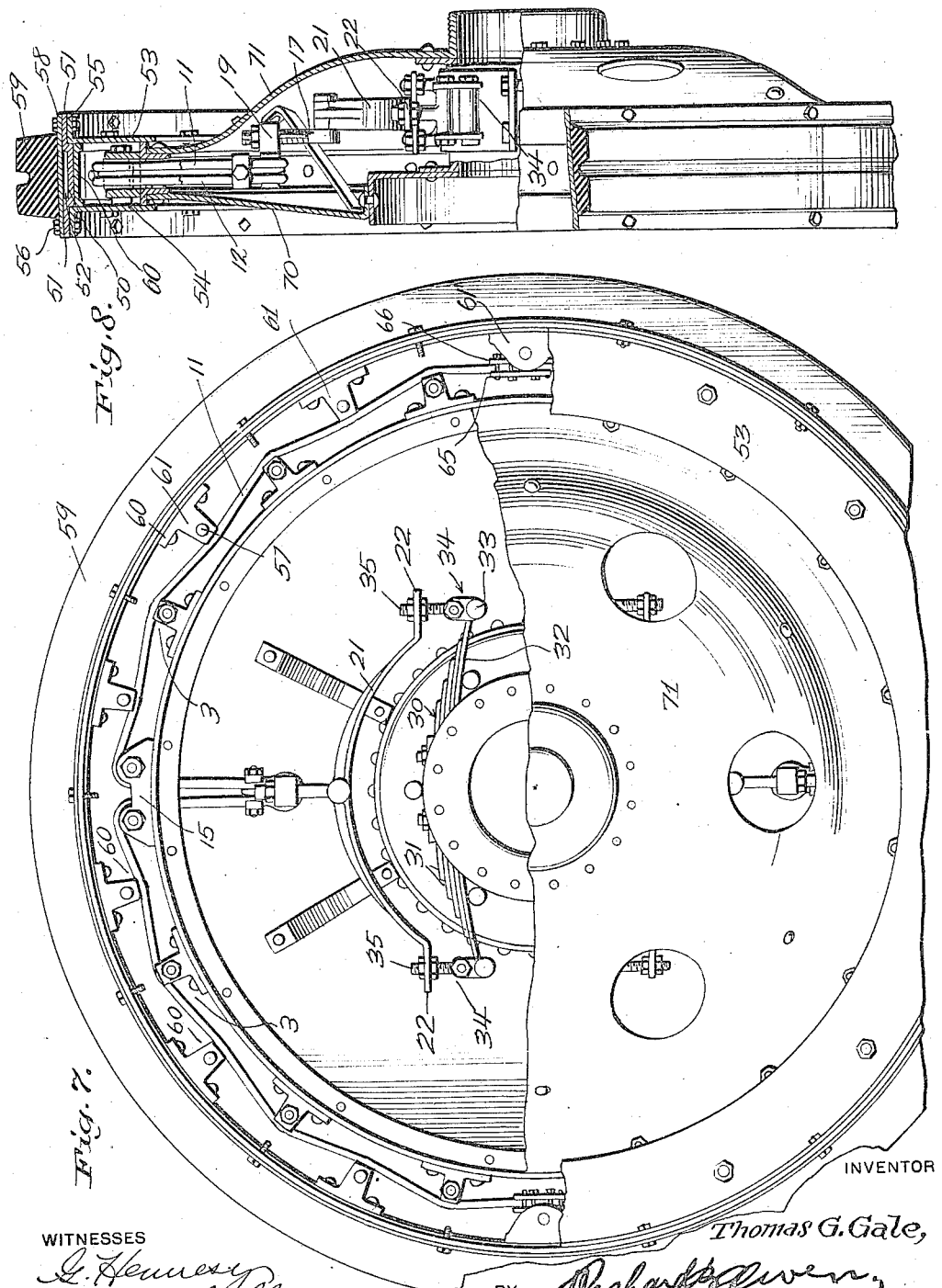

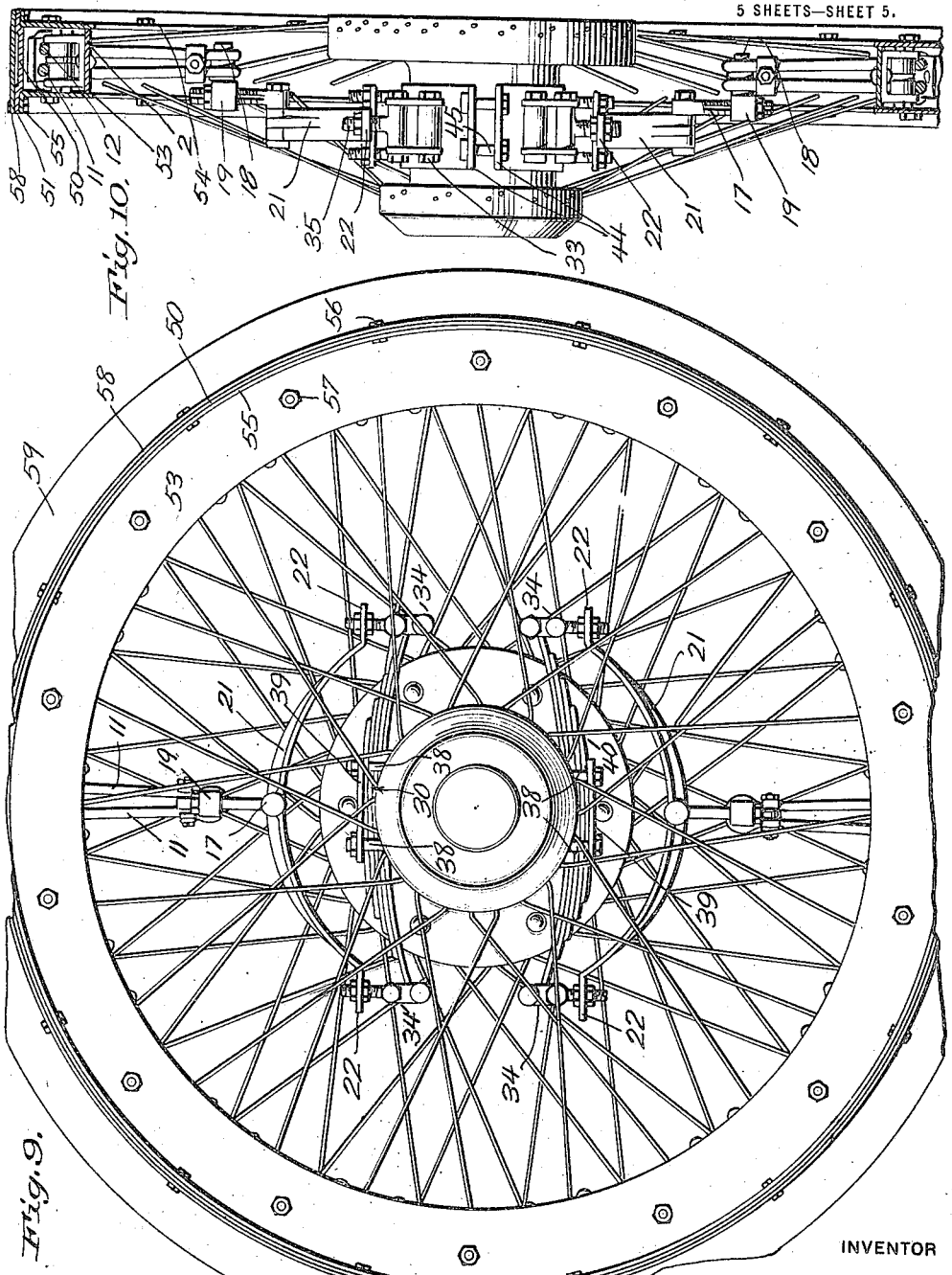

UNITED STATES PATENT OFFICE.

THOMAS G. GALE, OF SAGINAW, MICHIGAN.

RESILIENT WHEEL.

1,260,362.   Specification of Letters Patent.   Patented Mar. 26, 1918.

Application filed April 9, 1917. Serial No. 160,768.

*To all whom it may concern:*

Be it known that I, THOMAS G. GALE, a citizen of the United States, residing at Saginaw, in the county of Saginaw and State of Michigan, have invented certain new and useful Improvements in Resilient Wheels, of which the following is a specification.

This invention relates to improvements in vehicle wheels, and more particularly to resilient wheels characterized by the employment of parallel cables arranged upon supports fixed to the periphery of an inner rim.

The main object of the invention is to construct a wheel of this class equipped with simple and efficient shock absorbing means and so balanced as to adapt it especially for use on vehicles which are run at high speeds.

Another object is to provide a wheel of this character the first cost of which and the upkeep thereof are reasonable; which is puncture and blowout proof; from which a large mileage is obtainable and more traction; which will not skid and in which all side pressure is taken up.

Still another object is to so construct a wheel of this character that it may be assembled, dismantled and adjusted with the use of a wrench only and in which all of the parts are accessible for adjustment and repairs and which is capable of embodiment equally well in wooden, wire or steel disk wheels.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
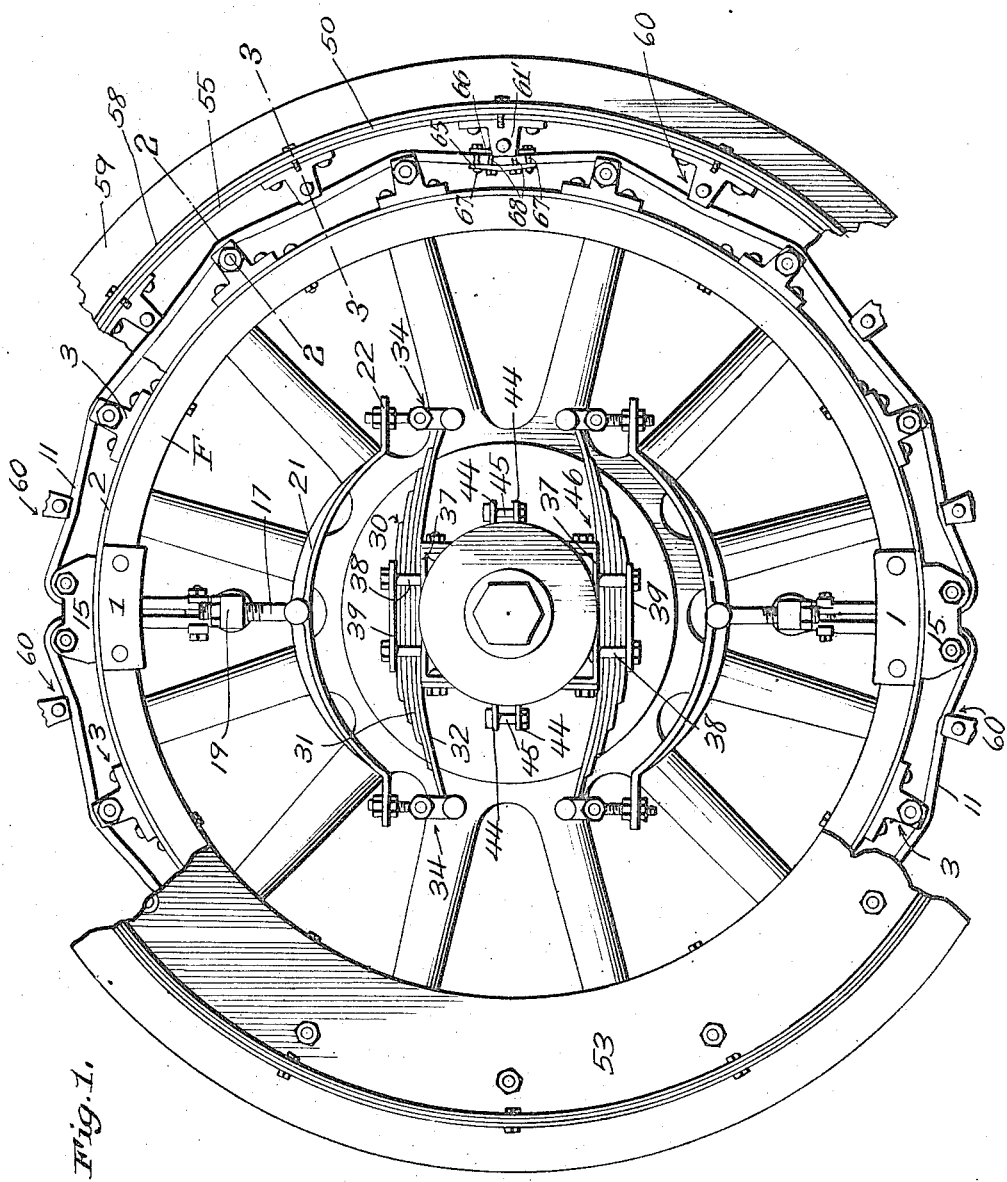
Figure 2:
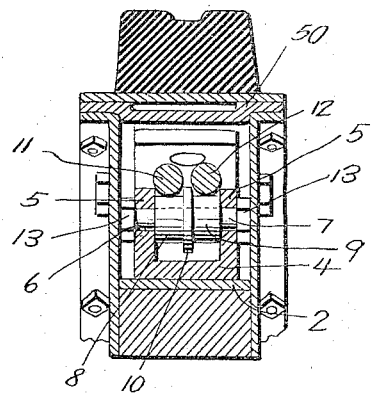
Figure 3:
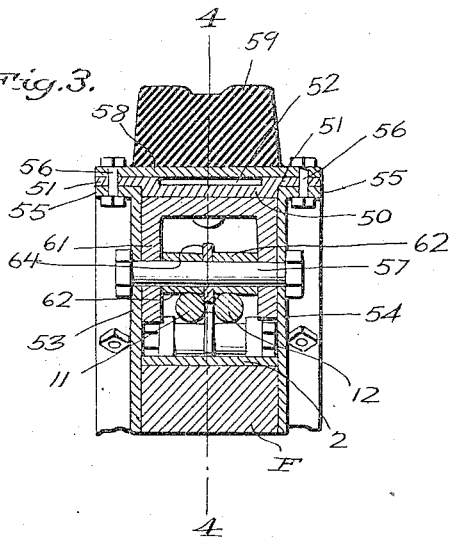
Figure 4:
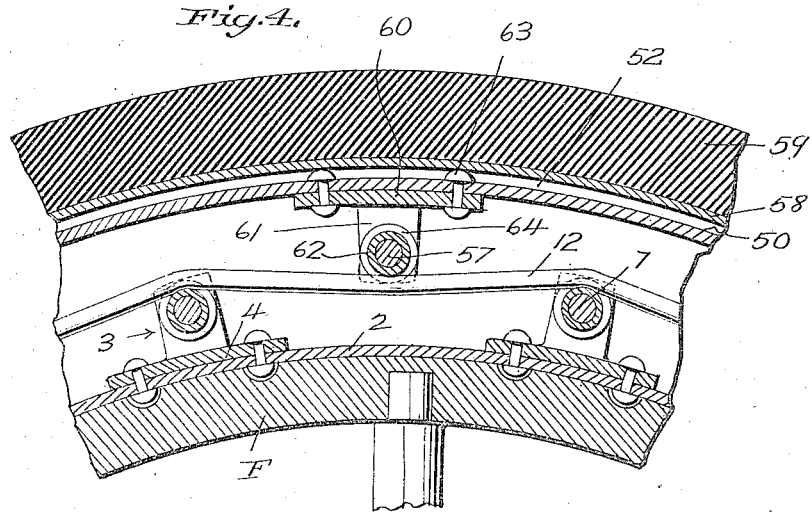

In the accompanying drawings:

Figure 1 represents a side elevation of a wooden wheel embodying this invention with parts broken out, Fig. 2 is a transverse section taken on the line 2—2 of Fig. 1, Fig. 3 is a similar view taken on the line 3—3 of Fig. 1, Fig. 4 is a detail longitudinal section taken on the line 4—4 of Fig. 3, Fig. 5 is a side elevation of a portion of the wheel, the tire and side plates being omitted, Fig. 6 is an edge or peripheral view thereof, Fig. 7 is a side elevation with parts broken out of a steel disk wheel embodying this invention, Fig. 8 is an edge view with parts in section of the wheel shown in Fig. 7, Fig. 9 is a side elevation with parts broken out of a wire wheel constructed in accordance with this invention, and Fig. 10 is an edge view partly in section of the wheel shown in Fig. 9.

In the embodiment illustrated in Figs. 1 to 6, in which the invention is shown applied to a wooden wheel, a felly F of usual construction is shown composed of two sections connected by plates as 1 to provide for the spacing apart of the ends of the felly sections for a purpose hereinafter to be described, said section ends being arranged at diametrically opposite points as is shown clearly in Fig. 5.

A steel tire or rim 2 is riveted or otherwise secured to the periphery of the felly F and has mounted thereon around its periphery, a plurality of cable supports 3 which are spaced apart any suitable or desired distance and which are constructed as shown more clearly in Figs. 2 and 4. These supports which are made in the form of brackets, comprise attaching plates 4 having outwardly projecting posts 5 which are apertured as shown at 6 to receive a pintle 7 which carries rollers 8 and 9 spaced apart by a disk 10 and on which are designed to be supported two parallel endless cables 11 and 12. These rollers 8 and 9 are disposed between the outwardly projecting posts 5 of brackets 3 and their pintles 7 are provided on their outer ends with nuts 13 as shown clearly in Fig. 2.

These cables 11 and 12 extend between the spaced ends of the sections of felly F as is shown clearly in Fig. 5, passing over rollers 14 carried by brackets 15 mounted on the periphery of the wheel at diametrically opposite points, said rollers being preferably spaced a sufficient distance to permit the cables to pass between them through a gap formed between the ends of the felly sections. These loop-shaped portions of the cable which are so passed through these gaps are engaged with connectors 16 which connect the cables with springs 30 and 40 hereinafter to be described.

Each of the connectors 16 comprises a shank or stem 17 which carries a block 19 having a laterally extending pin 18 around which the looped portions of the cables 11 and 12 are designed to pass, being held separated by a spacing plate 20. This block is held in adjusted position on the stem or shank 17 by means of a nut 19' which engages the threaded end of said stem. This shank or stem 17 is connected at its inner end with an arcuate spring-connecting member 21 midway the length thereof and the opposed ends of this member extend laterally outward as shown at 22 and are connected with the spring 30. As shown, these springs are made in the form of a plurality of plate springs 31 of varying lengths, five being here shown connected to form a unitary spring 30. The longer inner member 32 of this spring has its opposed ends bent to form bearings through which pintles 33 pass and are designed to connect the spring 30 to hangers 34 and by means of which they are united to the arcuate member 21. These hangers 34 are adjustably connected with the arms 22 of the member 21, being provided with outwardly projecting threaded stems or shanks 35 which pass through apertures in said arms. These shanks 35 are held in engagement with the arms 22 by means of nuts 36 arranged on opposite faces of the arms 22 as is shown clearly in Figs. 1 and 5.

It is to be understood that two of these spring members are employed in connection with each wheel, both being exactly alike and arranged at diametrically opposite points on the hub of the wheel and consequently it is necessary to describe only one in detail. These springs, which are here designated 30 and 40 are connected with the wheel hub by means of U-shaped brackets 37, one of which is employed for each spring. These brackets 37 are each secured to the spring which it connects by means of bolts 38 which pass through the cross bar of the bracket 37 and through a plate 39 arranged on the outer face of the super-imposed spring plates 31 and whereby said plates are rigidly and securely connected to said bracket midway the ends thereof.

These U-shaped brackets 37 are adjustably connected with each other on each side of the hub by arcuate clamping plates 41 and 42, those on one side being exactly like those on the other. These plates 41 and 42 are riveted at one end to the legs 43 of the brackets 37 and have laterally and outwardly extending apertured lugs 44 on their opposed ends through which pass tightening bolts 45, said ends being spaced sufficiently apart to provide for the adjustment of said plates 41 and 42 toward each other a sufficient distance to provide for a rigid clamping of the springs on the hub.

From the above description, it will be obvious that the cables 11 and 12 which pass over the supports 3 on the rim 2 may have their tension varied by two adjustments, one being the connections of the arcuate members 21 with the springs 30 and 40 and the other being through the stems 17 and blocks 19.

Arranged around rim 2 and spaced radially therefrom is an outer rim 50 in the form of a steel tire having its opposed edges offset laterally outward to provide flanges 51 and a recess or peripheral groove 52 between said flanges as is shown clearly in Figs. 3 and 4, said groove being designed to receive the heads of rivets which are employed for connecting cable engaging members 60 carried by said rim 50. This rim 50 is wider than rim 2, the distance between the outer edges of the grooved portion thereof being of the same width as rim 2 as is shown clearly in Figs. 2 and 3, so that when protecting plates 53 and 54 are applied to the opposite faces of the two rims, they will fit snugly against both of them on their opposed side edges and thus completely close the space between them. These plates 53 and 54 are provided at their outer peripheral edges with laterally extending outwardly projecting flanges 55 which are designed to fit flat against the inner faces of the flanges 51 of rim 50 and to be bolted thereto by bolts 56, as shown in Fig. 3.

These combined reinforcing and guard plates 53 and 54 are also transversely connected by means of bolts 57 which pass through the opposed plates and through the bearings or hangers 61 of the cable engaging members 60 and perform the double function of connecting bolts for plates 53 and 54 and as pintles for rollers 62 disposed between the hangers 61 as is shown clearly in Fig. 3.

These cable engaging members 60 are disposed at intervals around the inner face of rim 50 in position to engage the cables between the cable supports 3 carried by the inner rim. These members 60 as shown clearly in Fig. 3, are substantially U-shaped in cross section, the cross bars thereof being secured to the inner faces of rim 50 by rivets 63, the heads of which are housed in the groove 52 of rim 50 between the outer face of said rim and the inner face of an auxiliary rim or band 58 which carries a tread member 59 of any suitable or desired construction, said member here being shown in the form of a solid rubber tire. The rollers 62 which are mounted on the pintle 57 of each member 60 are separated by a disk 64 and these rollers are designed to bear on the cables 11 and 12 when the parts are assembled as is shown clearly in Figs. 1 and 3.

The band 58 is of the same width as rim 50 and is secured thereto by the bolts 56 which pass through flanges 55 of the side plates 53 and 54, through the rim flanges 51 and through band 58. The outer rim 50 is connected with the cables 11 and 12 at diametrically opposite points and midway between the brackets 15 where said cables pass through the inner rim and connect with the arcuate members 21. The means for securing said rim 50 to these cables comprises a pair of clamping plates 65 and 66 between which the cables are disposed and clamped by U-bolts 67 and 68, the two end bolts 67 being shown passed through the plates from one side and those 68 through the opposed side of the clamp as is shown clearly in Figs. 1 and 5. The legs of these U-bolts are spaced sufficiently far apart to permit the two cables to be arranged between them in separated relation.

The outer plate 66 has radially or outwardly extending apertured lugs as 69, two of which are employed, one being arranged at one side edge of said plate and one at the other, said lugs being designed to pass between two of the hangers 61' of one of the members 60 carried by rim 50 and secured thereto by one of the bolts 57 which passes through these hangers 61' and through the apertured lugs and thereby connects the clamp with rim 50.

It will thus be seen that the outer rim 50 is rigidly secured to the cables 11 and 12 at diametrically opposite points by these clamps just described and that it is further engaged with said cables by means of the rollers 62 carried by the members 60 which bear on the cables between the supports 3 carried by the inner rim 2.

From the above description it will be obvious that the cables 11 and 12 operate as a drive for the outer rim 50 and also as a flexible bearing for it. These endless cables 11 and 12 pass from the springs 30 and 40 carried by the hub of the wheel over the diametrically opposite supports 14 mounted on the inner rim of the wheel at an angle of less than ninety degrees and these supports thus communicate, the motion of the wheel through the cables to the outer rim, and relative vertical movement of the outer rim carrying the tire and said plates 53 and 54 is possible in any position of the wheel in a vertical plane. The springs 30 and 40 may be easily adjusted to provide equal resistance so that the center of the outer rim 50 strives always to coincide with the center of the wheel. In the use of this wheel, the springs being adjusted to support the weight of the vehicle, when a shock is applied to the outer rim 50, such as is occasioned by the wheel striking an obstacle in the road, the tendency of the outer rim is to move vertically upward and in so doing, causes the supports 60 on the portion of the outer rim nearest the ground to press upward against the cables while the supports 60 at the diametrically opposite portion of the wheel are lifted from the cables. The outer rim being firmly attached to the cables at two opposite points, this upward motion and the pressure of the lower cable supports upon the cables is possible only through the rolling over their supports of the set or sets of cables, in what happens to be at the instant, the lower half of the wheel and this action is against one or both of the springs 30 and 40. These springs resist this throwing of the outer rim off its center and thereby operate as shock absorbers.

The term "set of cables" is employed to indicate that portion of the double endless cables lying between the point of attachment of the outer rim to the cables and one of the points of attachment of the cable to a number 21. It will thus be seen that the cables are not permitted to slide at the points where they are attached to the springs, and that the outer rim is therefore capable of independent vertical motion corresponding in amount to its ability to work against the tension of the springs at the hub. This ability varies to a certain extent according to the degree of shock encountered. Very slight movement of the cables over their supports is needed to give the cushioning effect desired.

Although only one way of passing the cables over the cable supports of the wheel, one way of attaching the outer rim to the cables and one way of providing tension on the cables, are shown in the accompanying drawings, it is to be understood that many other ways may be employed and that while two cables are shown in the embodiment herein described, one or more may be used.

It is also of course understood that this wheel is intended primarily for use on motor driven vehicles and that its principal object is to provide a shock absorbing wheel, balanced and capable of high speed and in which no punctures are possible; and any style of tread may be employed in connection therewith.

In the embodiment illustrated in Figs. 7 and 8, the invention is shown embodied in a steel disk wheel instead of the wooden wheel shown in the figures above described, and the only difference in this form of the invention over that contained in the other figures is that disks 70 and 71 are employed for connecting the rim of the wheel to the hub instead of the spokes shown in the first form. This form of wheel being well known in this art, it is therefore not deemed necessary to describe in detail the various parts of such a wheel in connection with which this invention is shown applied, the mounting of the cables, the inner and outer rims, and the connection of the cables with the springs being exactly the same as those described in connection with the form shown in Figs. 1 to 6.

In Figs. 9 and 10, this invention is shown applied to a wire wheel. The construction of the parts constituting the invention, and the form and arrangement thereof being exactly the same as those shown and described in Figs. 1 to 6 and the form of wheel in connection with which they are employed in Figs. 9 and 10 being well known in the art, it is not deeemed necessary to describe the details of such a wheel.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A resilient wheel comprising an outer and an inner rim spaced from each other, the inner rim having diametrically opposite openings, means for supporting the outer rim relatively to the inner comprising an endless cable disposed between said rims and supported by said inner rim, said cable passing through the openings in said inner rim, arcuate members fixedly connected with the portions of said cable which extend through said rim, and springs carried by the wheel hub and connected with said arcuate members.

2. A resilient wheel comprising an outer and an inner rim spaced from each other, the inner rim having diametrically opposite openings, means for supporting the outer rim relatively to the inner comprising an endless cable disposed between said rims and passing through the openings in said inner rim, means for supporting said cable and arcuate members fixedly connected with the portions of said cable which extend through said rim, springs carried by the wheel hub, and connectors for the ends of said springs and said arcuate members.

3. A resilient wheel comprising an outer and an inner rim spaced from each other, the inner rim having oppositely disposed openings, an endless cable disposed between said rims and passing through said openings, means for supporting said cable, springs carried by the hub of the wheel, a cable connector connected at its ends to said springs, and a connection between the portions of said cable which extend through said openings and said connectors at points intermediately of the ends of said connectors.

4. A resilient wheel comprising an outer and an inner rim spaced from each other, the inner rim having openings, an endless cable disposed between said rims and passing through said openings, means for supporting said cable, springs carried by the hub of the vehicle, and connectors between said springs and the portions of the cable which are passed through said openings, said connectors comprising stems having blocks with which the cable portions are engaged, spring connecting members extending in opposite directions from the inner ends of said stems, and hangers connecting the free ends of said members with the free ends of the springs.

5. A resilient wheel including an outer and an inner rim spaced radially from each other, a plurality of peripherally spaced cable supports radiating from said inner rim, two of said supports being arranged diametrically opposite each other and adjacent openings extending through said inner rim, a cable resting on said supports and passing through the openings in said rim, arcuate members fixedly connected with the portions of said cable which extend through said rim, springs carried by the hub of said wheel and adjustably connected with said arcuate members, cable engaging means carried by said outer rim on its inner face and adapted to bear on the cable at points between the inner rim cable supports, and means for fixedly connecting said outer rim with said cable at diametrically opposite points.

In testimony whereof I affix my signature in presence of two witnesses.

THOMAS G. GALE.

Witnesses:
E. N. MORRILL,
H. J. TEN ELSHOF.

Copies of this patent may be obtained for five cents each, by addressing the "Commissioner of Patents. Washington, D. C."